United States Patent [19]
Lechner et al.

[11] Patent Number: 5,532,452
[45] Date of Patent: Jul. 2, 1996

[54] WELDING ROBOT

[76] Inventors: Manfred Lechner, Silvanastr. 12/2, 81927 Muenchen; Dietbert Klein, Ludwig-Thoma-Str. 4, 85405 Nandlstadt, both of Germany; Wolfgang Koelbl, 8 Pendil Close, Wellington, Telford, TF1 2PQ, Great Britain

[21] Appl. No.: 286,229

[22] Filed: Aug. 5, 1994

[30] Foreign Application Priority Data

Aug. 5, 1993 [DE] Germany ............ 43 26 338.0

[51] Int. Cl.⁶ .................................................. B23K 9/12
[52] U.S. Cl. ......................... 219/124.34; 219/125.1
[58] Field of Search ..................... 219/124.34, 125.1, 219/130.01, 137 R

[56] References Cited

U.S. PATENT DOCUMENTS

| | | | |
|---|---|---|---|
| 4,621,185 | 11/1986 | Brown | 219/124.34 |
| 5,107,093 | 4/1992 | Ekelof et al. | 219/124.34 |

FOREIGN PATENT DOCUMENTS

| | | | |
|---|---|---|---|
| 4101422A1 | 7/1991 | Germany. | |
| 1-181970 | 7/1989 | Japan | 219/137 R |
| 5-212540 | 8/1993 | Japan | 219/130.01 |

*Primary Examiner*—Clifford C. Shaw
*Attorney, Agent, or Firm*—Evenson, McKeown, Edwards & Lenahan

[57] ABSTRACT

A welding robot, in particular for automatic welding of spirally bent tubes for producing dynamically balanced thrust nozzles, is provided with a sensor arrangement which scans the course and the cross-sectional geometry, in particular the gap width, of the joint gap between the components to be welded together. The robot includes an evaluation unit generating setting signals, and a setting device which is controlled by the setting signals and which adjustably sets the welding parameters (welding speed and welding output) and guides the welding head along the joint gap in a multi-axially adjustable manner. In order to provide an automatic, real-time adaptation of the welding parameters with little structural and computational effort, even under difficult welding conditions, and to improve the welding quality significantly in spite of a high working speed, the evaluation unit contains a data memory with a plurality of welding parameter data sets respectively associated with different joint gap cross section geometries, and a control stage which forwards the welding parameter set associated with the respectively detected joint gap geometry as a setting signal to the setting device.

11 Claims, 2 Drawing Sheets

WELDING ROBOT

BACKGROUND AND SUMMARY OF THE INVENTION

The present invention relates to a welding robot for automatic welding of spirally bent tubes for producing dynamically balanced thrust nozzles comprising a welding head, a sensor arrangement which scans a course and a cross-sectional geometry including a gap width of a joint gap between components to be welded together, an evaluation unit coupled to the sensor unit and which generates setting signals, and a setting device coupled to the evaluation unit and the welding head, which setting device is controlled by the setting signals and adjustably sets welding parameters and guides the welding head along the joint gap in a multi-axially adjustable manner.

Welding robots with a laser-optical sensor device by which the welding head is adaptively guided along the spatial path of the joint gap, where the welding head control is automatically changed at the start or end of the seam for the purpose of providing overlapping or multiple welds are known. However, such welding robots which operate purely with position control and a rigid repetition of a welding process course once it has been set, without being able to compensate for unavoidable interferences in the welding process, produce a very irregular welding bead formation when welding components with an uneven geometry of the joint gap. This is particularly true for spirally bundled, thin-walled tubes, for example for regeneratively-cooled thrust nozzles. There are also frequent welding errors with respect to the effective seam length. The cause of this lies in too small or too large local melt bath sizes in the area of the component edges.

With the known automatic welding robots of the initially-mentioned type, the welding process itself is affected in addition to the kinematic welding control for reasons of an improved welding quality. In this way not only the path of the joint gap, but also the geometry of the joint gap or the weld seam geometry are continuously scanned during the welding operation in order to adapt the definitive welding parameters, such as the welding path speed or the welding current, to the local welding requirements. Thus the characteristic seam data, such as the weld seam width, the seam camber or the penetration can be maintained at the predetermined set values, independently of the occurring interferences. In the process, the translation of the values measured by the sensor into corresponding welding parameter set commands takes place computer-assisted with the aid of regulating or control elements on the basis of control algorithms, non-linear observer models or multi-dimensional performance characteristics data, amended in accordance with the sensor signals. Because of the complexity of the welding process, this entails such a large structural and computing effort that in actuality, along with having to accept a reduced welding quality, the welding process control is limited to one or at best a few variable welding parameters, such as the welding current and/or the wire feed rate. For reasons of a real-time signal evaluation it is mostly necessary to keep the welding path speed clearly below the maximum value which would be possible per se on the basis of welding technology.

An object of the present invention is to provide a welding robot of the initially-described type which achieves a high welding quality with a small apparatus and computer expenditure and with full use of the maximal welding path speed possible on the basis of welding technology, even under difficult welding conditions and particularly in connection with a very irregular joint gap geometry.

This and other objects are achieved by the present invention which provides a welding robot particularly for automatic welding of spirally bent tubes for producing dynamically balanced thrust nozzles comprising a welding head, a sensor arrangement which scans a course and a cross-sectional geometry including a gap width of a joint gap between components to be welded together, an evaluation unit coupled to the sensor unit and which generates setting signals, and a setting device coupled to the evaluation unit and the welding head, which setting device is controlled by the setting signals and adjustably sets welding parameters and guides the welding head along the joint gap in a multi-axially adjustable manner. The evaluation unit includes a data memory with a plurality of welding parameter data sets respectively associated with different joint gap cross section geometries, and a control stage which selects the respective welding parameter data set controlling the setting device during the welding process in accordance with the detected joint gap geometry.

The component scanning by the welding robot in accordance with the invention is limited to a few measuring signals identifying the joint gap geometry, including the joint gap width. These measuring signals are translated into corresponding welding process control commands by a data call-up which uses simple computer technology without complicated, time-consuming computing operations. By means of this it is possible to assure an automatic, sensitive real-time adaptation of all important welding parameters, and therefore a high welding quality, during the ongoing welding process, without it being necessary, because of a time delay in signal evaluation, to maintain the welding path speed at a low value which per se is unnecessary for assuring quality.

In certain preferred embodiments, the edge shape of the joint gap is scanned in addition to the gap width and is incorporated into the welding parameter control in such a way that, when a contour change of the component edges is sensed, in the interest of an increased quality assurance the automatic welding process is either interrupted or is continued by calling up an appropriately changed welding parameter data set, e.g. with a changed electrode distance and/or a different welding current intensity. For reasons of an improved quality assurance, a level difference of the component edges is compensated by a corresponding reorientation of the welding electrode in a practical way in certain embodiments of the invention. This prevents an asymmetric distribution of the arc with respect to the component edges.

For reasons of a structurally simple and sturdy design, along with simultaneous high measuring accuracy, the joint gap is preferably scanned in certain embodiments, in an optical manner. This is done by a laser beam strip directed crosswise to the joint gap. A measurement value sensor which detects the cross-sectional data of the joint gap is provided for signal evaluation.

In accordance with certain embodiments of the invention, the welding parameter data sets which are experimentally determined on sample workpieces prior to starting the automatic welding process respectively contain adjustment commands not only for the welding current and the welding path speed, but preferably also for the electrode distance and a supplemental material supply, depending on the joint gap, for protective gas shielded arc welding. Certain embodiments of the present invention additionally scan the degree of reflection in the area of the joint gap edges by means of the sensor arrangement to include a protective gas adjustment command called up in accordance with the detected degree of reflection in the welding parameter data sets.

In certain embodiments of the invention, a video camera is attached to the welding head for visual control of the weld seam during the ongoing welding process.

In particularly preferred embodiments of the invention, a control device reacting to an upper and a lower welding voltage threshold value is disposed in the current supply circuit, by which a frequent source of welding errors, the cause of which is found to be excessive electrode consumption or spatters of material adhering to the electrode tip and consequently inadmissible welding voltage values, is effectively removed in a structurally simple manner.

Other objects, advantages and novel features of the present invention will become apparent from the following detailed description of the invention when considered in conjunction with the accompanying drawings.

DETAILED DESCRIPTION OF THE DRAWINGS

Figure 1:
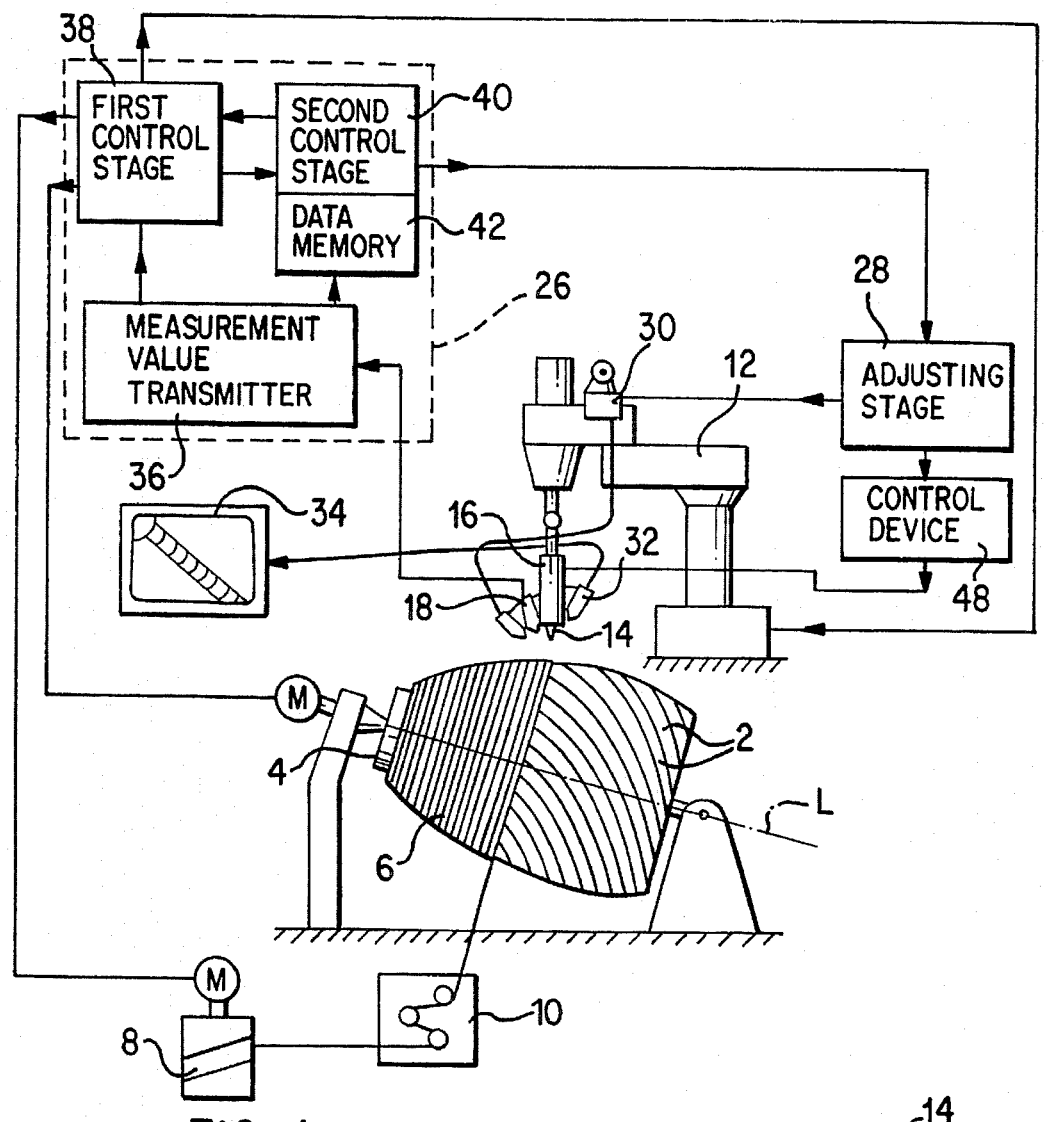
FIG. 1 shows a robot system constructed according to an embodiment of the present invention for automatic welding of a thrust nozzle in a spiral construction.

The robot system of the present invention illustrated in the drawings is used for automatic welding of spirally bent pipes 2 which, for producing a regeneratively cooled dynamically balanced thrust nozzle, are fastened in a tightly bundled manner on an assembly core 4, rotatable around the longitudinal axis L, by means of a wire band 6 and are connected with each other to form a rigid nozzle structure by arc welding. For this purpose, the wire band 6 is unwound step by step by a motor-driven wire draw-off roller 8 having an adjustable holding moment and self-adjusting reversing unit 10. After each unwinding step, all of pipes 2 are welded together over their respectively exposed length at their adjoining edges in such a way that the weld seam sections following each other in the direction of the pipe length overlap until finally the entire pipe bundle is provided with weld seams continuously extending from the front to the rear pipe ends.

Figure 2:
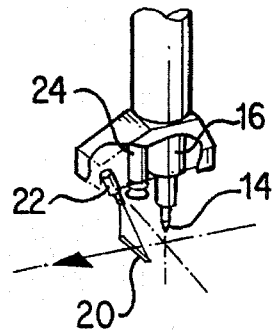
FIG. 2 is a perspective partial view of the combined welding and scanning head.
Figure 3A:
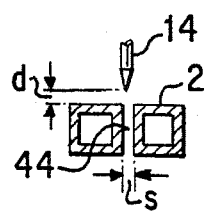
FIG. 3 shows some varied joint gap cross sections with a respectively correspondingly adjusted welding electrode.
Figure 3B:
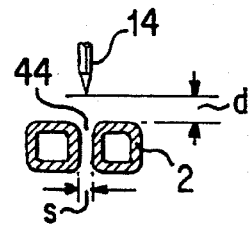
Figure 3C:
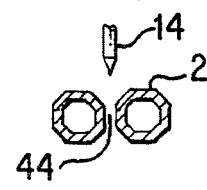
Figure 3D:
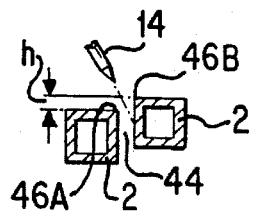

The welding robot taking over the automatic welding control contains an actuator 12 which in respect to the pipe bundle is multi-axially rotatable and translationally controllable. The actuator 12 has a welding head 16 supporting the welding electrode 14 and an optical scanning head 18 fastened on the welding head 16. As shown in FIG. 2, the optical scanning head 18 has a laser beam source 22 generating a laser beam strip 20 directed crosswise to the welding feed direction R, and of a CCD camera 24 directed to the laser beam strip 20. The image signals of the CCD camera 24 are fed to a signal evaluation unit, generally indicated by 26. The evaluation unit 26 controls, via the actuator 12, the movement guidance of the combined welding and scanning head 16, 18, including the electrode distance, the electrode inclination and the rate of welding feed, as well as the welding current and a supply device 30 for the selective addition of supplemental material via an adjusting stage 28. Furthermore, the drive motors M for the assembly core 4 and the draw-off roller 8 are coordinated with each other and with the control of the welding head 16 by the evaluation unit 26.

A video camera 32, directed toward the surface of the pipe bundle in the area of the electrode 14, is fastened on the combined welding and scanning head 16, 18 for visual welding control. A display screen 34 is connected downstream of the video camera 32 and the welding process can be observed on it.

The evaluation unit 26 contains a measurement value transmitter 36, which detects from the output signals of the scanning head 18 a weld seam covered by the laser beam strip 20 or a joint gap between the pipes 2 and discriminates them from each other and enters the corresponding joint gap coordinates in a first control stage 38, which controls the actuator 12 and the drive motors M.

In addition, the measurement value transmitter 36 determines the important cross sectional data of a detected joint gap from the scanning signals of the scanning head 18, in particular the gap width, the shape of the edges and a possible height mismatch of the pipes 2 delimiting the gap. These measurement data are forwarded to a second control stage 40 which is coupled with the first control stage 38. The second control stage 40 contains a data memory 42 in which different welding parameter data, previously determined experimentally for respectively different joint gap geometries, are stored. Of these, the data set which is applicable to the respectively determined local joint gap geometry is called up by the control stage 40 for controlling the adjusting stage 28 and —via the control stage 38 and the actuator 12—for control of the feed rate of the welding electrode 14 and, if required, for correcting the electrode position, such as the electrode distance and/or the electrode inclination in respect to the joint gap.

Various gap geometries, together with the associated electrode settings, are shown in FIG. 3. In accordance with FIG. 3a, the pipes 2, which laterally delimit the joint gap 44 of the gap width s, have a sharp-edged outer contour, and during welding the welding electrode 14 is guided centered and symmetrically in respect to the joint gap cross section at the electrode distance d. In accordance with FIG. 3b, the pipes 2 are provided with rounded edges and the joint gap 44 has a somewhat increased gap width s. The welding electrode 14 is adjusted to a correspondingly changed electrode distance d, but during the welding process continues to remain centered and oriented symmetrically in relation to the joint gap 44. A further cross sectional configuration of the joint gap 44, also different in view of the signal evaluation, results in accordance with FIG. 3c in a polygonal outer contour of the pipes and a joint gap 44 correspondingly upwardly widened in a V-shape. A height mismatch h between the pipes 2 delimiting the joint gap (FIG. 3d) is taken in consideration in that the electrode 14 is tilted transversely to the long direction of the joint gap towards the lower pipe 2, so that it is oriented perpendicularly and centered on the connecting line between the pipe edges 46 A, B delimiting the joint gap 44.

Figure 4:
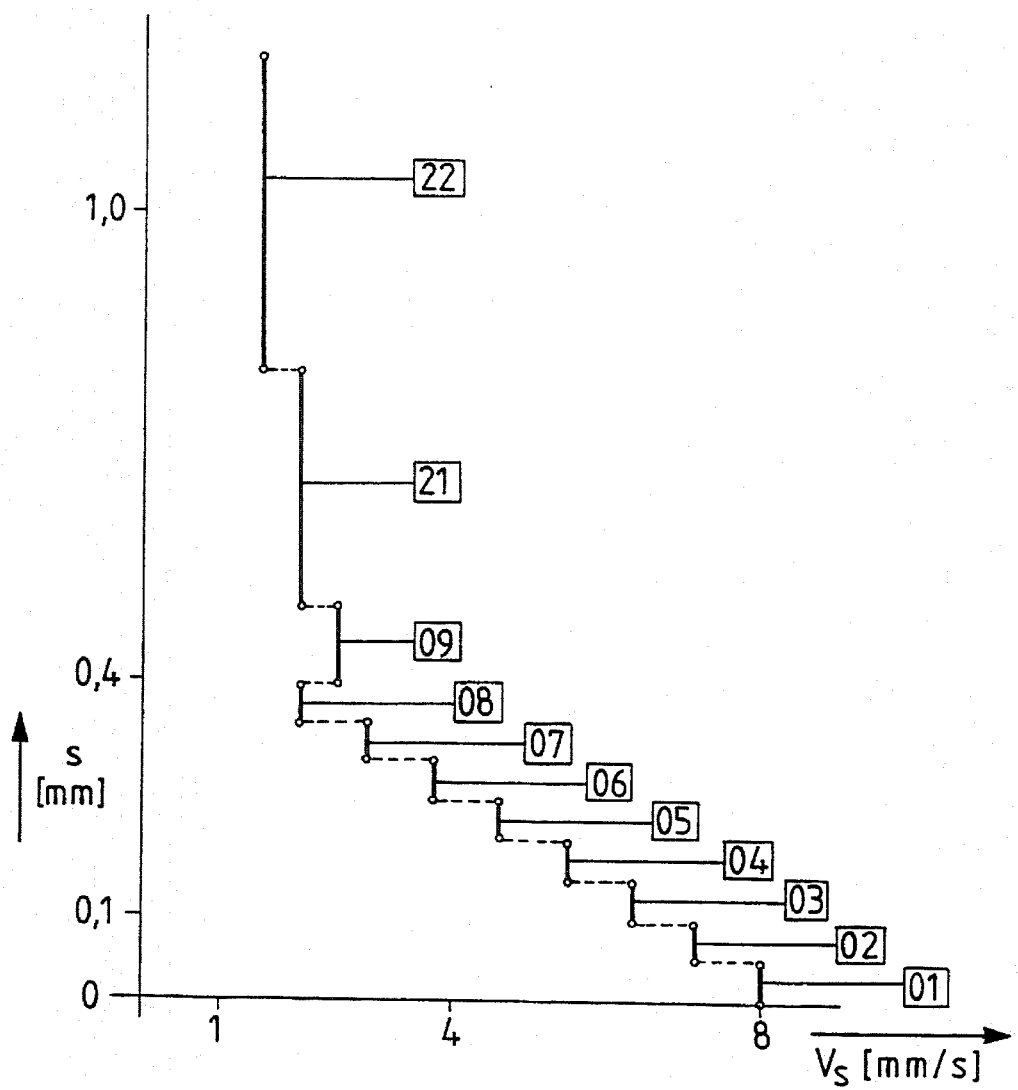
FIG. 4 is an operational characteristic of the robot system consisting of experimentally predetermined welding parameter data sets staggered as a function of the joint gap width.

FIG. 4 shows a characteristic curve of the control stage 40 as a function of the local joint gap width s for a defined pipe edge shape and without consideration of a height mismatch h having an effect on the setting of the welding parameter. The characteristic curve is staggered in accordance with successive size ranges of the joint gap width s and consists of different welding parameter data sets, which respectively contain a defined set value for the rate of welding feed $v_s$, the electrode distance d, the supplemental material supply as well as the basic current intensity, the pulse height, the frequency and the pulse/pause ratio of the arc welding current. As can be seen, the feed rate $v_s$ first is decreased with an increasing joint gap width s, wherein the welding current is reduced in steps between the data sets 01 and 08 and the weld seam is produced without supplemental material. With continued increase of the joint gap width s, welding is performed in accordance with the data set 09 with again increased welding current and increased feed rate $v_s$, but still without welding supplement. Subsequently, in the welding modes 21 and 22 supplemental material is added and the feed rate $v_s$ and the welding current are decreased in steps. Further welding parameter sets (not shown) in the data memory 42 relate, among other things, to the overlap mode, wherein the end of the pre-seam is first fused while at a standstill and then at a slow feed rate.

To adapt the protective gas supply to possible surface dirt accumulations at the component edges 46, the degree of reflection of the surface areas near the edges is also detected by the scanning head 18 and the measurement value transmitter 36. A further welding parameter is added to the welding parameter data sets which contains a set command for the supply of protective gas which changes as a function of the detected reflection value, so that the protective gas supply is either adjusted as a function of the called up reflection degree welding parameter or the welding process is switched off if the soiling of the surface is too great.

The kinematic set commands, i.e. the feed rate $v_s$, the electrode distance d and a possible position correction of the welding electrode 14 (FIG. 3d) are transmitted by the respective welding parameter data set called up by the control stage 40 in accordance with the output signals from the measurement value transmitter 36 to the control stage 38. There they are translated in the course of following the joint gap 44 into corresponding set signals for the welding electrode 14. The set commands for the welding current, the welding supplement and the protective gas supply are entered directly into the adjusting stage 28 by the control stage 40 and cause a corresponding setting of the supply device 30 and the welding current pulses. A control device 48 is associated with the adjusting unit 28 and is located in the course of the welding current supply to the welding head 16. The control device 48 reacts if the welding voltage exceeds or falls below an upper or lower threshold value predetermined for the respectively set current intensity. This can occur in case of an excessive electrode consumption or when spatters of material adhere to the electrode tip, whereupon the welding process is interrupted by the control device 48 for the purpose of an electrode change.

Figure 5:
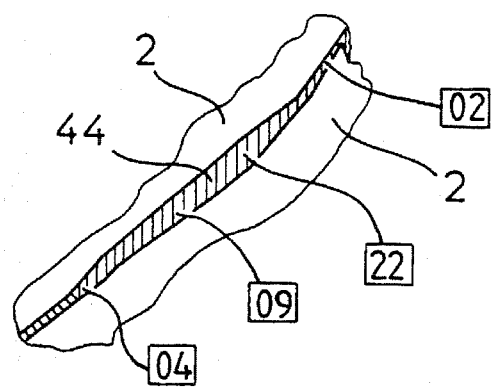
FIG. 5 shows a typical joint gap course with an irregular joint gap geometry and correspondingly changing welding parameter setting.

The typical course of a joint gap 44 between adjoining pipes 2 is shown in FIG. 5. The robot system described not only guides the welding electrode 14 automatically along the joint gap 44, but all important welding parameters are continuously and automatically adjusted in real time during the welding process in accordance with the detected local joint gap geometry, such as is indicated by the welding parameter data sets added to the individual joint gap cross section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A welding robot for automatic welding of components, comprising:

a welding head;

a sensor arrangement which scans a course and a cross-sectional geometry including a gap width of a joint gap between components to be welded together;

an evaluation arrangement coupled to the sensor unit and which generates setting signals;

a setting device coupled to the evaluation unit and the welding head, which setting device is controlled by the setting signals and adjustably sets welding parameters and guides the welding head along the joint gap in a multi-axially adjustable manner;

wherein the evaluation unit includes a data memory with a plurality of welding parameter data sets respectively predetermined for different joint gap cross section geometries, and a control stage which selects a respective welding parameter data set in accordance with the detected joint gap geometry for controlling the setting device during the welding process.

2. A welding robot in accordance with claim 1, wherein the welding parameter data sets include a welding parameter which is dependent on an edge shape of the joint gap that is scanned by the sensor arrangement.

3. A welding robot in accordance with claim 1, further comprising means for continuous scanning of a height position of the joint gap edges and position correction of an electrode tip of the welding head for compensating an edge height mismatch.

4. A welding robot in accordance with claim 1, wherein the sensor arrangement has an optical scanning head and a measurement value transmitter downstream of the optical scanning head to receive scanning signals from the optical scanning head, the measurement value transmitter determining the cross-sectional data of the joint gap from the scanning signals.

5. A welding robot in accordance with claim 4, wherein the scanning head is a laser beam head.

6. A welding robot in accordance with claim 1, wherein the welding parameter data sets respectively include set values for a welding current, a rate of welding feed, an electrode distance and a supplemental material supply activated as a function of the joint gap, for protective gas arc welding of the components.

7. A welding robot in accordance with claim 1, wherein the sensor arrangement includes means for scanning a degree of reflection in an area of the joint gap edges, and wherein the welding parameter data sets include set values for a protective gas supply which vary according to the detected degree of reflection.

8. A welding robot in accordance with claim 1, further comprising a video camera carried along on the welding head and providing visual welding control.

9. A welding robot in accordance with claim 1, further comprising a control device which interrupts a current supply to said welding head when a welding voltage exceeds an upper threshold value and when the welding voltage falls below a lower threshold value.

10. A welding robot in accordance with claim 1, wherein said components comprise three-dimensionally curved components.

11. A welding robot in accordance with claim 10, wherein said curved components comprise spirally bent tubes for producing dynamically balanced thrust nozzles.

* * * * *